US012371926B2

(12) United States Patent
Hartmann et al.

(10) Patent No.: US 12,371,926 B2
(45) Date of Patent: Jul. 29, 2025

(54) LOCK

(71) Applicant: SUDHAUS GMBH & CO. KG, Iserlohn (DE)

(72) Inventors: Michael Hartmann, Iserlohn (DE); Antonio Digiovanni, Latena (DE); Joerg Raschke, Wiehl (DE); Jakob Lagutkin, Werl (DE)

(73) Assignee: SUDHAUS GMBH & CO. KG, Iserlohn (DE)

( * ) Notice: Subject to any disclaimer, the term of this patent is extended or adjusted under 35 U.S.C. 154(b) by 1663 days.

(21) Appl. No.: 16/483,538

(22) PCT Filed: Feb. 23, 2018

(86) PCT No.: PCT/EP2018/000073
§ 371 (c)(1),
(2) Date: Aug. 5, 2019

(87) PCT Pub. No.: WO2018/157967
PCT Pub. Date: Sep. 7, 2018

(65) Prior Publication Data

US 2020/0024866 A1 Jan. 23, 2020

(30) Foreign Application Priority Data

Mar. 3, 2017 (DE) ........................ 102017002014.0

(51) Int. Cl.
*E05B 37/02* (2006.01)
*E05B 37/00* (2006.01)

(52) U.S. Cl.
CPC ...... *E05B 37/0041* (2013.01); *E05B 37/0034* (2013.01); *E05B 37/0058* (2013.01); *E05B 37/02* (2013.01)

(58) Field of Classification Search
CPC .. E05B 37/00; E05B 37/0041; E05B 37/0034; E05B 37/0058; E05B 37/02; Y10T 70/7141
(Continued)

(56) References Cited

U.S. PATENT DOCUMENTS 7,958,757 B1 6/2011 Lee

FOREIGN PATENT DOCUMENTS

CN 1051787 12/2015
DE 10206991 A 9/2003
(Continued)

*Primary Examiner* — Suzanne L Barrett
(74) *Attorney, Agent, or Firm* — Andrew Wilford

(57) ABSTRACT

The invention relates to a locking device (1) for containers, doors, cabinets, furniture, or the like, which locking device has a lock plate (4), on which a combination lock (7), which has setting wheels (9), and a secondary lock (8) are arranged, and a stator (3), in relation to which the lock plate (4) having the combination lock (7) and the secondary lock (8) is rotatably arranged, the lock plate (4) having the combination lock (7) arranged thereon and with the secondary lock (8) arranged thereon being able to freely rotate 360 degrees relative to the stator (3) in the locked state of the locking device (1). In order to indicate opening of the locking device (1) by actuation of the secondary lock (8) to a person possessing the opening code of the combination lock (7), according to the invention, when the locking device (1) is opened by means of the secondary lock (8), the setting wheels (9) and coupling hubs (11) of the combination lock (7), which coupling hubs are associated with the setting wheels and can be axially moved relative to the setting wheels, can be uncoupled and an opening code of the combination lock (7) can be reset from an opening code set by means of the secondary lock (8) at the time of the opening of the locking device (1) to a specified factory code.

8 Claims, 7 Drawing Sheets

(58) Field of Classification Search
USPC ........................................................ 70/284
See application file for complete search history.

(56) References Cited

FOREIGN PATENT DOCUMENTS

| | | | | | |
|---|---|---|---|---|---|
| DE | 202009010324 | U | | 1/2011 | |
| DE | 102014006673 | A | | 11/2015 | |
| DE | 102017004622 | A1 | * | 11/2018 | |
| DE | 102019114332 | A1 | * | 8/2020 | ......... H01R 13/6397 |
| EP | 1574641 | A | | 9/2005 | |
| EP | 2541708 | A2 | * | 1/2013 | ............. H02G 3/185 |

* cited by examiner 10
8
9
2
4
12
7
13
11
14
27
25
26
16
17
19
18
1
5
28
6
22
20
3
24
24
24
24

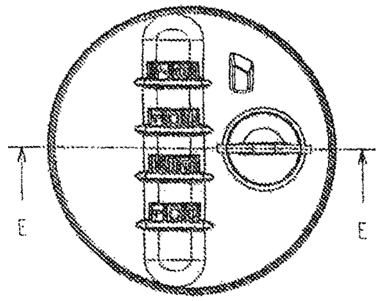
Fig.10
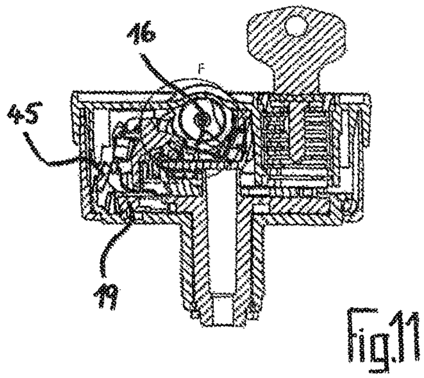
Fig.11
Fig.12
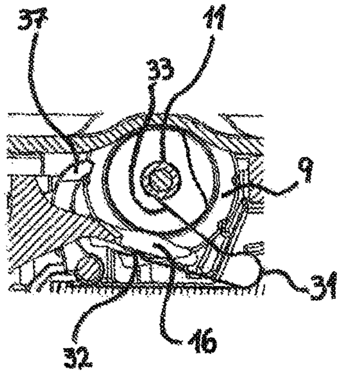
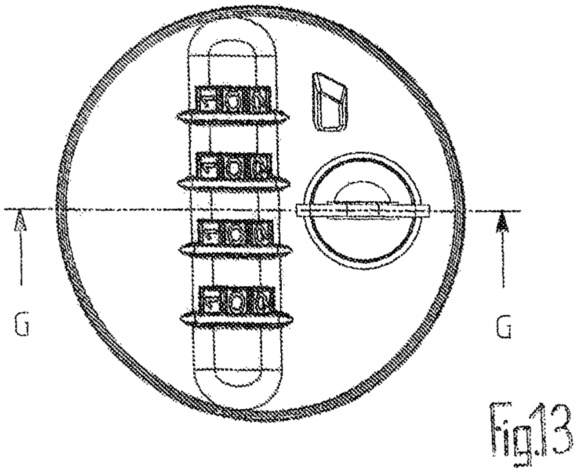
Fig.13
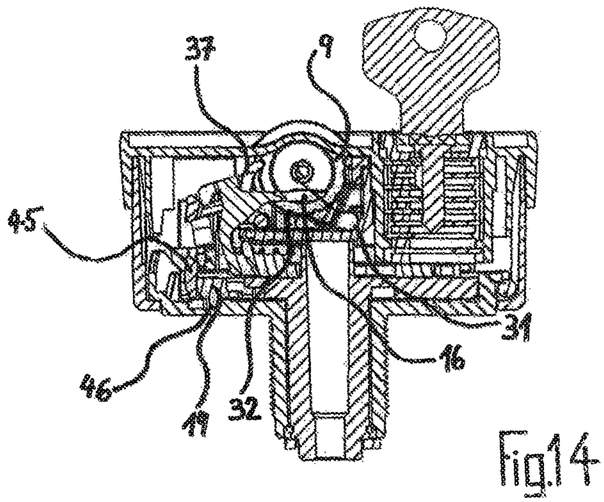
Fig.14

LOCK

CROSS REFERENCE TO RELATED APPLICATIONS

This application is the US-national stage of PCT application PCT/EP2018/000073 filed 23 Feb. 2018 and claiming the priority of German patent application 102017002014.0 itself filed 3 Mar. 2017.

FIELD OF THE INVENTION

The invention relates to a lock for containers, doors, cabinets, furniture or the like, with a lock plate on which a combination lock with setting wheels and a secondary lock are provided and a stator in relation to which the lock plate having the combination lock and the secondary lock is rotatable, the lock plate having the combination lock arranged thereon and with the secondary lock arranged thereon being able to freely rotate 360° relative to the stator in the locked state of the lock.

BACKGROUND OF THE INVENTION

In such locks, the secondary lock serves to enable a person who is not in possession of the opening code or key secret of the combination lock to open the lock. This is useful, for example, if the users of the locks frequently change, as is the case, for example, with lockers, cabinets or the like in school buildings, sports centers or companies with temporary staff. In these cases, for example a janitor should be able to open the lock equipped with the combination lock if, for example, the former user of the lock can no longer be found with reasonable efforts.

In the case of the locks described above, the problem can naturally arise that a janitor or a person who has obtained the key of the secondary lock in any form without authorization can gain access to the container closed by the lock.

OBJECT OF THE INVENTION

On the basis of the prior art described above, it is an object of the invention to further develop the generic lock for containers, doors, cabinets, furniture or the like in such a manner that a person who is currently authorized to use the lock and is accordingly in possession of the key secret is virtually automatically made aware that the lock has been opened at least once by actuation of the secondary lock since this person last has used it.

SUMMARY OF THE INVENTION

This object is achieved according to the invention in that, when the lock is opened by the secondary lock, the setting wheels and coupling hubs of the combination lock, which coupling hubs are associated with the setting wheels and can be axially moved relative to the setting wheels, can be uncoupled and an opening code of the combination lock can be reset from an opening code set by the secondary lock at the time of the opening of the lock to a specified factory code. If the person in possession of the key secret or the opening code of the combination lock notices when the lock is actuated that opening is not possible by the key secret known to him/her, it is clear that since the last use of the lock an opening process has taken place that has been carried out by actuating the secondary lock.

In a technically and constructionally less complicated way, it is possible to achieve a cancellation of the set or currently set opening code of the combination lock of the lock if the secondary lock is a key-operated locking cylinder by the actuation of which a control lever of the lock can be displaced in such a manner that the engagement between the setting wheels and the coupling hubs of the combination lock can be disengaged. Hereby, the set relative position of the setting wheels on the one hand and the coupling hubs on the other hand and thus the key secret currently set on the combination lock is canceled.

Resetting to the specified factory code can be easily achieved if preferably heart-shaped setting cams are provided on the setting wheels of the combination lock and preferably heart-shaped setting cams are provided on the coupling hubs of the combination lock, each setting cam on the setting wheel side and each setting cam on the coupling hub side each being assigned an adjusting lug of a shifting lever. If the engagement between the preferably heart-shaped setting cams on the setting wheel side on the one hand and the preferably heart-shaped setting cams on the coupling hub side on the other hand is disengaged by actuation of the secondary lock and if the setting wheels and the coupling lugs are displaced independently of one another by the interaction of the adjusting lugs of the shifting lever of the lock with the setting wheel-side and coupling hub-side heart-shaped cams, the key secret or the opening code of the combination lock of the lock can be reset to the factory code.

According to a suitable further development of the lock according to the invention, the lock plate with a housing and a lower end plate can be pressed against the force of a spring that keeps the lock plate at a spacing from the stator, toward the stator if recesses formed on the housing are aligned with lugs formed on the stator.

If, for the purpose of opening the lock when the lock plate is pressed against the force of the spring against the stator, the shifting lever with its adjusting lugs can be brought to bear against the setting cams on the setting wheel side and the setting cams on the coupling hub side, the setting wheels and the coupling lugs of the combination lock are suitably displaced such that the opening code of the combination lock is reset to the factory code.

In an advantageous and suitable further development of the lock according to the invention, a probe of the lock can be moved, due to displacement of a slide plate of the lock by a key-operated locking cylinder, to a position in which a coding slide can preferably be moved axially to disengage the engagement between the setting wheels and the coupling hubs of the combination lock. This embodiment does not provide the possibility to open the lock by the secondary lock that is a key-operated locking cylinder. Rather, actuating the locking cylinder opens up the possibility of resetting the key secret to its original state by actuating the accessible coding slide. The lock can then be opened due to the correspondingly changed key secret and the setting thereof on the combination lock that is implemented when the coding slide is actuated.

In an advantageous further development of the lock according to the invention, preferably heart-shaped setting cams are provided on the setting wheels of the combination lock and preferably heart-shaped setting cams are provided on the coupling hubs of the combination lock, each setting cam on the setting wheel side being assigned a resilient adjusting arm of a latch spring or leaf spring and each setting cam on the coupling hub side being assigned an adjusting lug of a shifting lever.

The lock according to the invention can be implemented in a constructionally and technically less complex manner if the probe and a driver of the lock are coaxially mounted and connected to one another, so that when the lock is being opened, the driver is kept and guided in an circumferential track of the stator of the lock and latching arms of the latch spring or leaf spring can be moved away from the setting wheels by the probe, so that the setting wheels can rotate freely and can be reset to a fixed number combination by the resilient adjusting arms of the latch spring or leaf spring and the adjusting cams on the setting wheel side.

BRIEF DESCRIPTION OF THE DRAWING

In the following, embodiments the invention will be explained in detail with reference to the drawing. In the figures:

FIG. 10 is a top view of the embodiment of the lock according to the invention shown in FIG. 9 in closed or freely rotatable position;

FIG. 11 is the section E-E in FIG. 10;

FIG. 12 is an enlarged view of detail F of FIG. 11;

FIG. 13 is a top view corresponding to FIG. 10 of the embodiment of the lock according to the invention shown in FIG. 9 in the open position;

FIG. 14 is the section G-G in FIG. 13;

SPECIFIC DESCRIPTION OF THE INVENTION

Figure 1:
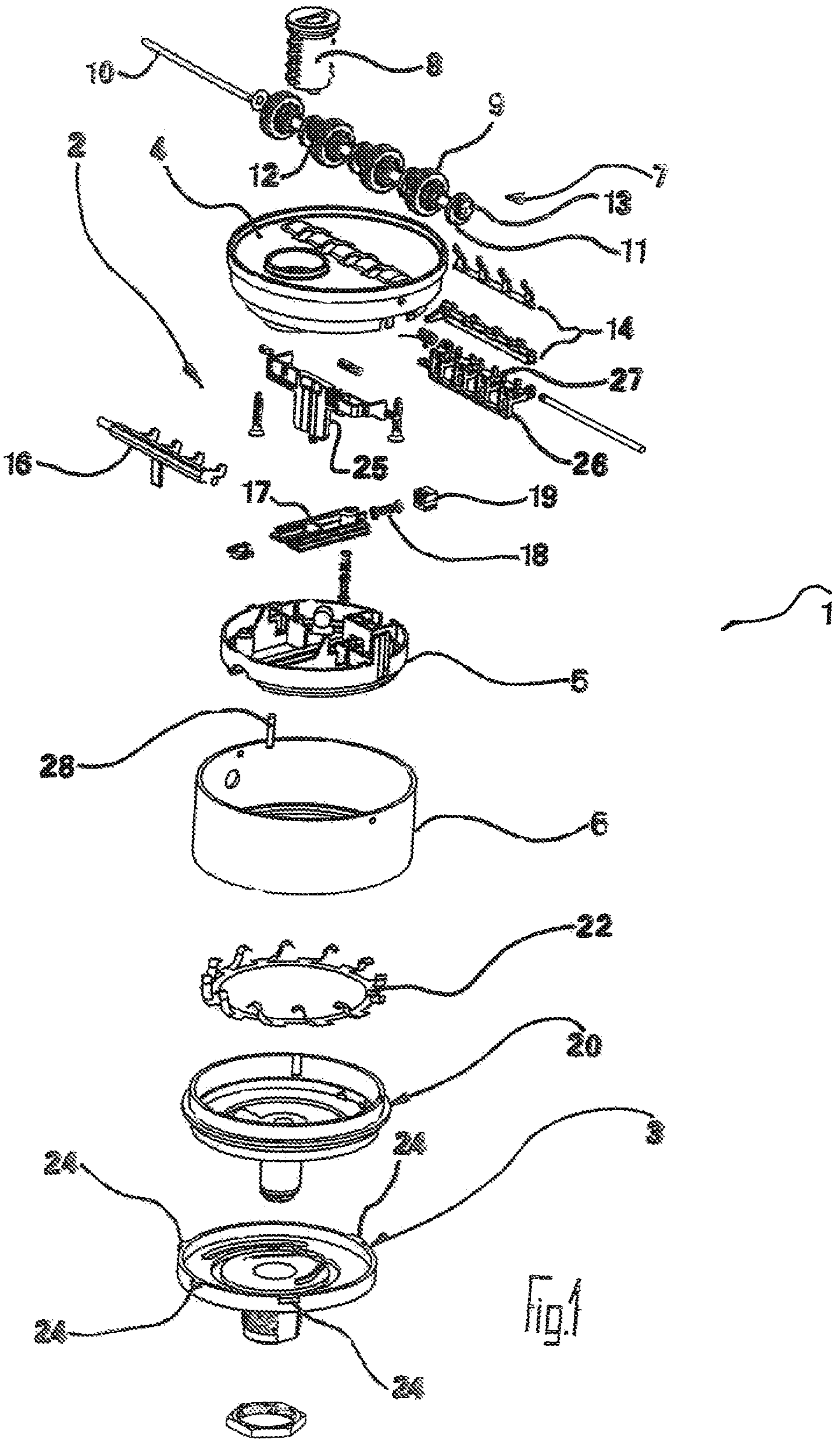
FIG. 1 is an exploded view of an embodiment of a lock according to the invention.

An embodiment of a lock 1 according to the invention explained hereinafter on the basis of FIGS. 1 to 8 serves, for example, to lock a piece of office furniture or other piece of furniture, e.g. a switch cabinet, a locker or the like that is not illustrated in the figures.

For this purpose, the lock 1 in the embodiment described in FIGS. 1 to 8 has a lock unit 2 that is rotatable in relation to a stator 3 of the lock 1, which stator is fixed to the container, a door, a cabinet, a piece of furniture or the like, which are not shown in FIGS. 1 to 8.

In the closed state of the lock 1, the lock unit 2 is able to freely rotate 360° relative to the stator 3 that is rotationally fixed.

The lock unit 2 has an upper lock plate 4, a lower end plate 5 and a cylindrical housing 6 that projects toward the stator 3 beyond the lower end plate 5 of the lock unit 2.

Between the upper lock plate 4 and the lower end plate 5, a combination lock 7 and a lock cylinder 8 as a secondary lock are accommodated in the cylindrical housing 6 of the lock unit 2.

The combination lock 7 includes setting wheels 9 of which four are available in the illustrated embodiment of the lock 1. The setting wheels 9 are mounted to be rotatable about an axis 10 and project through respective openings formed in the lock plate 4. A key or opening code of the combination lock 7 can be set on the setting wheels 9.

Coaxially to the setting wheels 9, coupling hubs 11 are mounted on each setting wheel 9 such that they can rotate about the axis 10 and the coupling hubs 11 on the axis 10 can move axially relative to the setting wheels 9. When there is axial engagement between the coupling hubs 11 on the one hand and the setting wheels 9 associated with them on the other hand, the setting wheels 9 and the coupling hubs 11 are rotationally fixed to each other; if the axial engagement is disengaged, they can be rotated with respect to each other.

Each setting wheel 9 is provided with a heart-shaped setting cam 12 as shown in the embodiment; similarly, a heart-shaped setting cam 13 as shown in the embodiment is formed on each coupling hub 11.

The setting wheels 9 of the combination lock 7 have a latching unit 14 that can be brought into latching engagement with outer latching surfaces of latching sections on the setting wheel 9 between the actual setting wheel section and the heart-shaped setting cam 12 so that latching of the setting wheels 9, which can be released with an extremely small amount of force, is achieved in positions in which information elements on the outer surface of the setting wheels 9 are clearly determined. The combination lock 7 further includes a lateral pushbutton 15 illustrated in FIG. 2, which can only be actuated or is not blocked if the opening code or key is set on the combination lock 7. By pressing the lateral pushbutton 15, axial engagement between the setting wheels 9 on the one hand and the coupling hubs 11 of the combination lock 7 on the other hand can be disengaged, so that the opening code or the key of the combination lock 7 can be changed and the lateral pushbutton 15 must remain pressed during such a change of the key or the opening code.

When the opening code is set on the combination lock 7, a probe 16 of the combination lock 7 comes into engagement with recesses formed in the coupling hubs 11.

Positively connected to the probe 16 is a slide 17 that can move a pressure latch 19 via a latch spring 18 from its rest position to its operating position in which a positive connection can be established between the lock unit 2 on the one hand and a locking latch 20 by the pressure latch 19.

When the positive engagement between the lock unit 2 on the one hand and the locking latch 20 on the other hand is established by the pressure latch 19, the locking latch 20 can be rotated together with the lock unit 2 relative to the stator 3. Due to the rotary movement of the locking latch 20, a locking member 21 fixedly attached to the locking latch 20 can be moved into and out of a lock latch, which is not shown in the figures.

A spring 22 between the lock unit 2 and the stator 3 can position the lock unit 2 at a predefinable spacing from the stator 3.

When recesses 23 formed on the lower edge of the cylindrical housing 6 are aligned with the radially outward projecting complementary lugs 24 formed on the stator 3, the lock unit 2 can be pressed against the stator 3 against the force of the spring 22.

A control lever 25 can be actuated by the lock cylinder 8 provided next to the combination lock 7 in the lock unit 2 when the locking cylinder is actuated by the corresponding key. When the control lever 25 is being actuated by the lock cylinder 8, it is displaced in such a manner that it disengages the setting wheels 9 from the coupling hubs 11 of the combination lock 7. Accordingly, each time the lock 1 is opened, the setting wheels 9 the coupling hubs 11 are disengaged from each other by the lock cylinder 8 provided as a secondary lock.

The combination lock further includes a shifting lever 26. The shifting lever 26 has adjustment lugs 27, namely one adjustment lug for each setting wheel 9 and one adjustment lug for each coupling hub 11.

The adjustment lugs of the shifting lever associated with the setting wheels 9 are provided in such a manner that they can act on the setting cams 12 on the setting wheel side. The adjusting lugs 27 of the shifting lever 26 associated with the coupling hubs 11 are provided in such a manner that they act on the setting cams 13 on the coupling hub side when the engagement between the setting wheels 9 on the one hand and the coupling hubs 11 on the other hand of the combination lock 7 is disengaged by the control lever 25.

The shifting lever 26 or its adjusting lugs 27 associated with the setting wheels 9 can displace the setting wheels 9 from their position corresponding to the opening code of the combination lock 7 and from any other position when the lock unit 2 is pressed against the force of the spring 22 in the direction of the stator 3 so as to open the lock 1 and then is rotated with respect to the stator 3 in the opening direction of the lock 1. For this purpose, a pin 28 is provided on the lower end plate 5 that runs on a control cam provided on the stator 3 and that can be moved linearly upward and downward by this control cam. Due to the linear upward and downward movement of the pin 28 on the end plate side, the shifting lever 26 can be moved in the direction of the heart-shaped setting cam 12 on the setting wheel side, whereby with each rotary movement of the lock unit 2, a displacement of the setting wheels 9 out of the position corresponding to the opening code of the combination lock 7 takes place.

When the secondary lock or the lock cylinder 8 is actuated to rotate the lock unit 2 with respect to the stator 3 so as to open the lock, the axial engagement between the setting wheels 9 on the one hand and the coupling hubs 11 on the other hand of the combination lock 7 is disengaged. Accordingly, during the rotary movement of the lock unit 2 with respect to the stator 3, the shifting lever 26 is moved up and down by the pin 28 and both the adjusting lugs 27 of the shifting lever 26 associated with the setting wheel-side setting cams 12 and the adjusting lugs 27 of the shifting lever 26 associated with the coupling hub-side setting cams 13 act on the setting cams 12, 13 on the setting wheel side and the coupling hub side, respectively, so that the opening code of the combination lock 7 set until the secondary lock or lock cylinder 8 is actuated is cancelled and the combination lock 7 is reset to the factory code.

Figure 6:
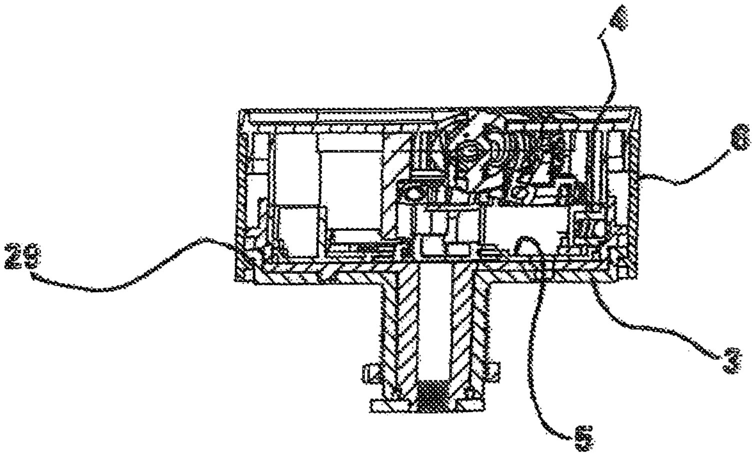
FIG. 6 a sectional view of the embodiment of the lock according to the invention shown in FIGS. 1 to 5 in the de compressed state.

To prevent the lock unit 2 from being pushed back in an upward direction by the spring 22 during the opening process of the lock 1, the lock 1 has a bayonet-like undercut 29 that is formed on the stator 3 on the one hand and on the cylindrical housing 6 on the other hand and can best be seen in FIG. 6.

Figure 2:
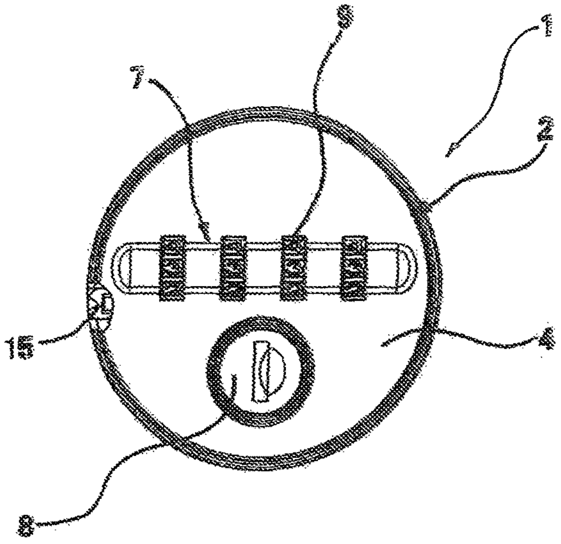
FIG. 2 is a top view of the embodiment of the lock according to the invention shown in FIG. 1 in the closed position.
Figure 3:
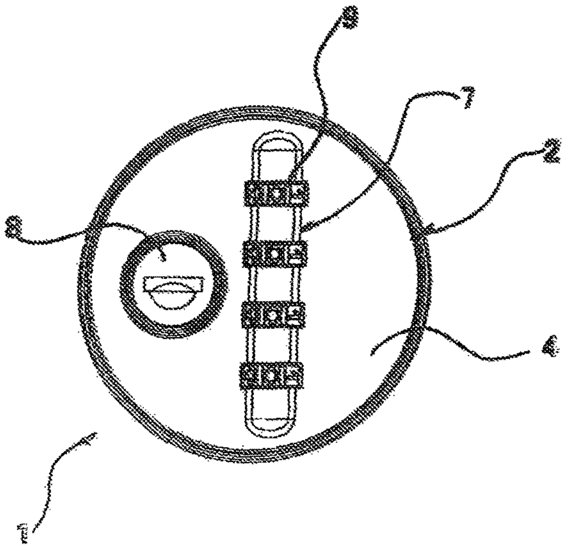
FIG. 3 is a top view of the embodiment of the lock according to the invention shown in FIG. 1 in the open position.

FIGS. 2 and 3 show the lock according to the invention in the closed and open position, respectively. The key secret or the opening code of the combination lock 7 can be set using the setting wheels 9 of the combination lock 7 that project through the openings in the upper lock plate 4 of the lock unit 2.

Furthermore, the key secret or the opening code of the combination lock 7 can be reprogrammed by the setting wheels 9, if the lateral pushbutton 15 is actuated and held beforehand. When actuating this lateral pushbutton 15, the coupling hubs 11 are axially decoupled from the setting wheels 9. Of course, it is necessary here that the current key secret or the current opening code of the combination lock 7 is set beforehand by the setting wheels 9 since otherwise the lateral pushbutton 15 is blocked so that it is not possible to change the key secret or the opening code of the combination lock 7.

Figure 4:
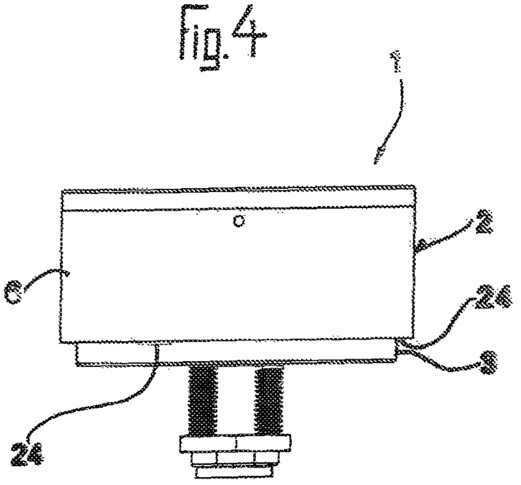
FIG. 4 is a side view of the embodiment of the lock according to the invention shown in FIGS. 1 to 3 in the relaxed position state.
Figure 5:
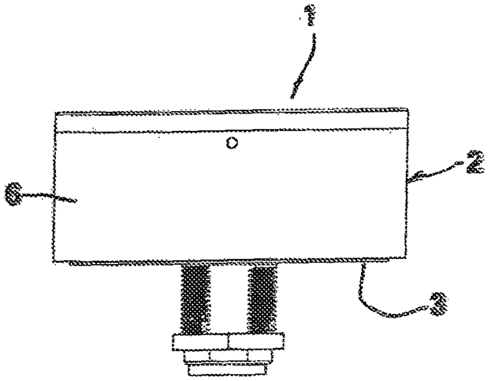
FIG. 5 is a side view of the embodiment of the lock according to the invention shown in FIGS. 1 to 3 in the compressed state.

To open the lock 1, it is necessary to press the lock unit 2 toward the stator 3 against the spring 22, as can best be seen from an overview of FIGS. 4 and 5.

Figure 7:
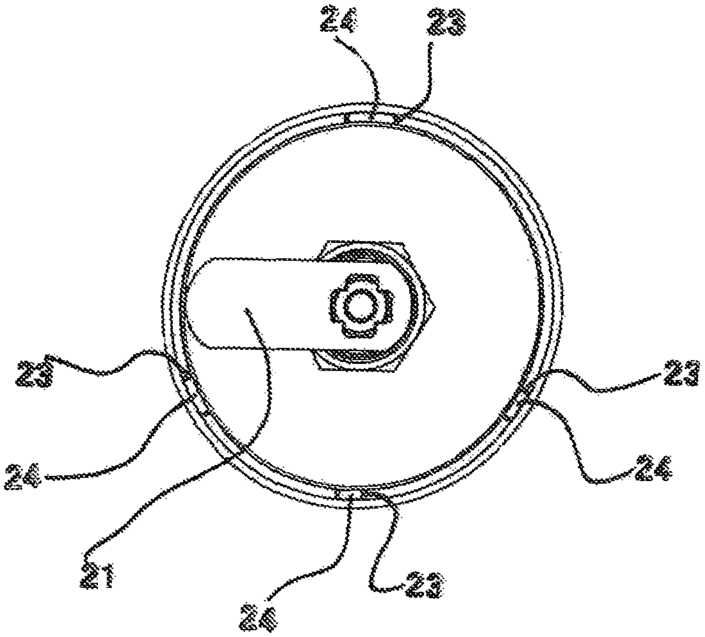
FIG. 7 is a rear view of the embodiment of the lock according to the invention shown in FIGS. 1 to 6.
Figure 8:
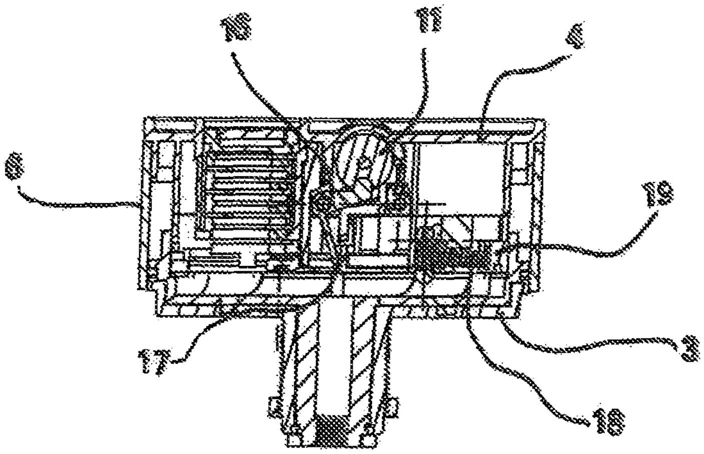
FIG. 8 is a cross-sectional view of the embodiment of the lock according to the invention shown in FIGS. 1 to 7 in the relaxed, not compressed state.

From the rear view of the lock 1 shown in FIG. 7, it is apparent that radially outwardly-directed lugs are formed on the outer edge of the stator 3. Only in a rotary position of the lock unit 2, in which recesses 23 formed on the lower edge of the cylindrical housing 6 of the lock unit 2 are aligned with the stator-side lugs, each stator-side lug 24 being associated with a receiving pocket 23 on the housing side, is it possible at all to press the lock unit 2 toward the stator 3. The stator-side lugs 24 and the housing-side pockets 23 each have different dimensions, so that each housing-side pocket 23 is associated with a single stator-side lug 24. This ensures that the lock unit 2 can only be pressed-in in a defined rotational or indexing position. In this indexing position, the recesses 23 on the housing side are correctly associated or aligned with the corresponding stator-side lugs 24.

When the currently correct key secret or the currently correct opening code is entered on the combination lock 7, the 16 extends into the trough-shaped recesses of the coupling hubs 11; in the course of this, the slide 17 is moved linearly between it and the interrogating piece 16 due to the positive connection. Due to the linear movement of slide 17, the pressure latch 19 is displaced between the pressure latch 19 and the locking latch 20 via the latch spring 18 in order to bring about a positive fit. As soon as the positive fit between the pressure latch 19 and the locking latch 20 has been established, the lock 1 can be opened.

The lock 1 includes the bayonet-like undercut 29 that prevents the lock unit 2 from springing back during the opening process of the lock 1. The lock unit 2 can only be pushed back to its initial position by the spring 22 when the lock unit 2 is rotated back to its initial position in relation to the stator 3.

The opening code set on the combination lock 7 is displaced during the opening process of the lock 1 by the sliding of the adjusting lugs 27 of the shifting lever 26 onto the heart-shaped setting cams 12 of the setting wheels 9; e.g. each of the setting wheels 9 is set to “zero”. To do this, the pin 28 gauges the stator-side control cam. This control cam moves the pin 28 linearly upward and downward, thereby moving the shifting lever 26 in the direction of the heart-shaped setting cams 12 on the setting wheel side. Movement the shifting lever 26 or its adjusting lugs 27 decouples the latching unit 14 from the setting wheels 9, so that shifting of the opening code or key secret can be completed. This shifting function ensures that unauthorized third parties cannot access the current key secret or the current opening code of the combination lock 7, or only with great difficulty.

The latching unit 14 is provided to ensure a defined position of all setting wheels 9 of the combination lock in relation to each other, enabling the key secret or opening code to be read.

When opening the lock 1 by actuating the secondary lock cylinder 8 functioning as the secondary lock with the matching key, the coupling hubs 11 and the setting wheels 9 of the combination lock are uncoupled from their engagement by the control lever 25.

In this state, both the heart-shaped setting cams 12 of the setting wheels 9 and the heart-shaped setting cams 13 of the coupling hubs 11 are shifted by the adjusting lugs 27 of the shifting lever 26.

If the lock unit 2 is now pressed toward the stator 3 and rotated in the opening direction of the lock 1, the currently set key secret or the currently set opening code of the combination lock is eliminated and the key secret or the opening code of the combination lock is automatically reset to the specified factory delivery state. This ensures that the key secret or the opening code of the combination lock 7 is always reset to the specified factory code when the lock 1 is opened by the locking cylinder 8.

This means that any manipulation attempt by the owner of the key of locking cylinder 8 or by an unauthorized owner of the respective key can be ruled out, since the current user of lock 1, when actuating this lock 1, notices that the key secret or the opening code of lock 1 has been reset or a new opening code or a new key secret has been programmed.

If the opening code or key secret of the combination lock 7 has been set incorrectly, the freewheel enables a 360° rotation between lock unit 2 on the one hand and stator 3 on the other hand. This is possible both when the lock unit 2 is positioned at a spacing from the stator 3 and when the lock unit 2 is pressed against the stator 3.

The shifting function is carried out with the lock unit 2 pressed against the stator 3 with a rotary movement of 360° in any direction both with correctly entered key secret and with incorrectly entered key secret.

A further embodiment of the lock 1 according to the invention explained in the following by FIGS. 9 to 32 also serves to lock a piece of office furniture or other piece of furniture not shown in the figures, e.g. a switch cabinet, a locker or the like.

For this purpose, in the embodiment described in FIGS. 9 to 32, the lock 1 has a lock unit 2 that is rotatable in relation to a stator 3 of the lock 1, which is fixed to the container, not shown in the figures, to a door, a cabinet, a piece of furniture or the like.

In the closed position of the lock 1, the lock unit 2 can be freely rotated by 360° with respect to the stator 3 arranged in a rotationally fixed manner.

The lock unit 2 has an upper lock plate 4 and a cylindrical housing 6 that extends in the direction of the stator 3.

Below the upper lock plate 4, a combination lock 7 with a locking mechanism carrier 30 and a locking cylinder 8 as a secondary lock are accommodated in the cylindrical housing 6 of the lock unit 2.

The combination lock 7 includes setting wheels 9, of which four are available in the illustrated embodiment of the lock 1. The setting wheels 9 are mounted to be rotatable about an axis 10 and project through openings formed in the lock plate 4. A key secret or an opening code of the combination lock 7 can be set on the setting wheels 9.

Coaxial with the setting wheels 9, one coupling hub 11 is mounted on each setting wheel 9 so that it can rotate about the axis 10 and the coupling hubs 11 are on the axis 10 such that they can move axially in relation to the setting wheels 9. In the case of axial engagement between the coupling hubs 11 on the one hand and the setting wheels 9 associated therewith on the other hand, the setting wheels 9 and the coupling hubs 11 are rotationally fixed with respect to one another; upon disengaging the axial engagement, they can be adjusted in the direction of rotation.

Each setting wheel 9 in the embodiment shown is provided with a heart-shaped setting cam 12; accordingly, on each coupling hub 11 in the embodiment shown, a likewise heart-shaped setting cam 13 is formed.

A latch spring or leaf spring 31 with latching arms 32 is associated with the setting wheels 9 of the combination lock 7, and the latching arms can be brought into latching engagement with latching sections that are formed on the outer surface of each setting wheel 9 to latch of the setting wheels 9 with a force that can be released with an extremely small amount of force, in positions in which the information elements provided on the outer surface of the setting wheels 9 and visible at the openings of the lock plate 4 are clearly determined.

In addition, on the latch spring or leaf spring 31, resilient adjusting arms 33 are formed that are provided such that they rest against and act on the outer surface of the heart-shaped setting cams 12 provided on the setting wheels 9 of the combination lock 7.

The combination lock 7 further includes a coding slide 34 that can be actuated or is not blocked if the opening code or key secret is set on the combination lock 7. By displacing the coding slide 34, the axial engagement between the setting wheels 9 on the one hand and the coupling hubs 11 of the combination lock 7 on the other hand can be disengaged, so that the opening code or the key secret of the combination lock 7 can be changed and the coding slide 34 must remain displaced during such a change of the key secret or the opening code.

When the opening code is set on the combination lock 7, a probe 16 of the combination lock 7 comes into engagement with recesses formed in coupling hubs 11.

A slide spring 36 pre-tensions a pressure latch 19 in its rest position, in which there is no positive fit between the lock unit 2 and a locking latch 20. When the pressure latch 19 moves from its rest position and reaches its operating position, a positive fit is established between the lock unit 2 on the one hand and a locking latch 20 on the other hand by the pressure latch 19.

If the positive engagement between the lock unit 2 on the one hand and the locking latch 20 on the other hand is established by the pressure latch 19, the pressure latch 20 can be rotated together with the lock unit 2 in relation to the stator 3. Due to the rotary movement of the locking latch 20, a locking member, not shown in FIGS. 9 to 32, which is fixed to the locking latch 20, can be displaced into and out of a lock latch that is also not shown in the figures.

The combination lock 7 also includes a shifting lever 37. The shifting lever 37 has adjusting lugs 38, namely one adjusting lug 38 per coupling hub 11.

The adjusting lugs 38 of the shifting lever 37 associated with the coupling hubs 11 are provided in such a manner that they can then act on the setting cams 13 on the coupling hub side when the engagement between the setting wheels 9 on the one hand and the coupling hubs 11 on the other hand of the combination lock 7 is disengaged.

The latch spring or leaf spring 31 or its resilient adjusting arms 33 associated with the setting wheels 9 can move the setting wheels 9 from their position corresponding to the opening code of the combination lock 7 and from any other position when the lock unit 2 is rotated in relation to the stator 3 in the opening direction of the lock 1. For this purpose, shifting cams 40 are provided and held in the housing 6, which shifting cams run on a slide guide on a lower plate 39 of stator 3 and can be moved linearly upward and downward by this slide guide.

Due to the linear upward and downward movement of the wiping cams 40, the probe 16 is moved in relation to the latch spring or leaf spring 31 in such a manner that the latching arms 32 of the latch spring or leaf spring 31 are moved away from the outer surface of the setting wheels 9, while the resilient adjusting arms 33 remain on the outer surface of the heart-shaped setting cams on the setting wheel side and move the heart-shaped setting cams 12 on the setting wheel side, whereby a displacement of the setting wheels 9 out of the position corresponding to the opening code of the combination lock 7 takes place with each rotary movement of the lock unit 2.

Figure 24:
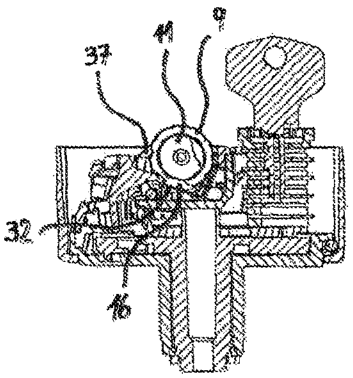
FIG. 24 is the section K-K in FIG. 23.
Figure 25:
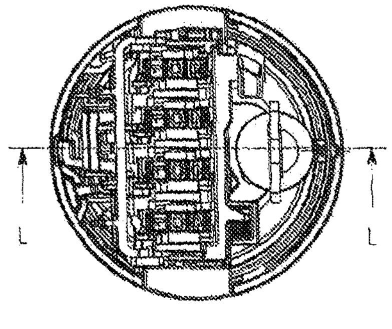
FIG. 25 is a top view corresponding to FIG. 23 of the embodiment of the lock according to the invention after rotation of a locking cylinder of a secondary lock thereof.
Figure 26:
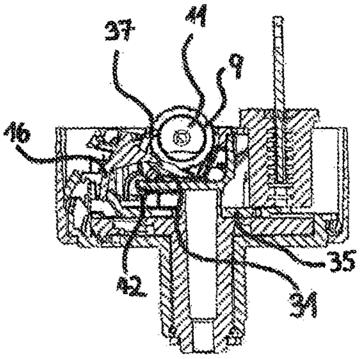
FIG. 26 is the section L-L in FIG. 25.
Figure 27:
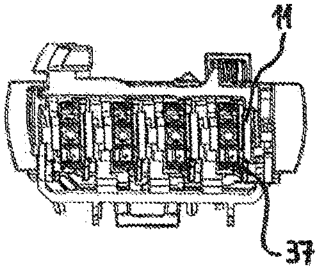
FIG. 27 is a top view of essential parts of the combination lock of the embodiment of the lock according to the invention shown in FIG. 25 during engagement between setting wheels and coupling lugs.

When the secondary lock or lock cylinder 8 that is provided next the combination lock 7 in the lock unit 2, is actuated to rotate the lock unit 2 in relation to the stator 3 to open the lock 1, the locking cylinder 8 is first rotated by 90° by the associated key. Due to this rotational movement of the locking cylinder 8, on the underside of which a pushing cam 41 is formed, a slide plate 35 is displaced. By moving the slide plate 35, the probe 16 resting against the outer surface of the coupling hub 11 is moved away from the outer surface of the coupling hubs 11. As a result of this movement of the probe 16, the latching arms 32 of the latch spring or leaf spring 31 are removed from the outer surface of the setting wheels 9, as can best be seen from an overview of the FIGS. 24 and 26. In addition, the shifting lever 37, whose adjusting lugs 38 are spaced apart from the outer surface of the coupling hubs 11 before the locking cylinder 8 is rotated by 90°, as shown in FIG. 24, is pivoted by the slide plate 35 by tensioning spring elements 42 arranged between the slide plate 35 and the shifting lever 37 until its adjusting lugs 38 rest against the outer surface of the coupling hubs 11, as is apparent from FIG. 26.

Figure 28:
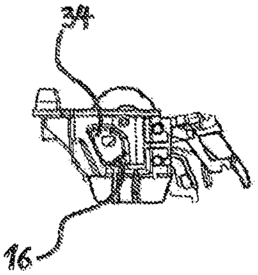
FIG. 28 is a side view of the essential parts of the combination lock shown in FIG. 27.
Figure 29:
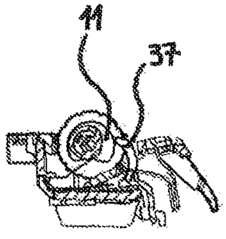
FIG. 29 is a an illustration corresponding to FIG. 28 of the coupling hub region of the combination lock of the embodiment of the lock according to the invention shown in FIG. 27.
Figure 30:
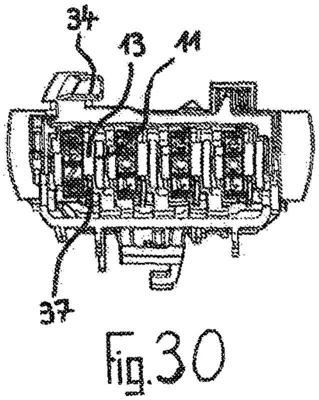
FIG. 30 is a top view corresponding to FIG. 27 with the engagement between setting wheels and coupling hubs disengaged by the coding slide.
Figure 31:
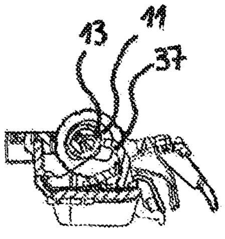
FIG. 31 is an illustration corresponding to FIG. 29 of the coupling hub region of the combination lock of the embodiment of the lock according to the invention shown in FIG. 30.

In addition, as can be seen best from FIG. 28, due to displacement of the probe 16 carried out by the slide plate 35, the coding slide 34 is released. From an overview of FIGS. 27 and 29 it is apparent that before the actuation of the coding slide 34, which is now possible, the shifting lever 37 with its adjusting lugs 38 presses against the outer surface of the coupling hubs 11. If now, after actuation of the locking cylinder 8 and the resulting release of the coding slide 3, the latter is moved from the position shown in FIG. 27 to its position shown in FIG. 30, the engagement between the setting wheels 9 and the coupling hubs 11 of the combination lock 7 is disengaged. Due to the axial displacement of the coupling hubs 11 by the coding slide 34, the adjusting lugs 38 of the shifting lever 37 move from the outer surface of the coupling hubs 11 to the outer surface of the heart-shaped setting cams 13 on the coupling hub side, as is best seen from an overview of FIGS. 29 and 31 and then displace the coupling hubs 11 from the position corresponding to the currently set key secret of the combination lock 7 to their original or zero position.

Figure 32:
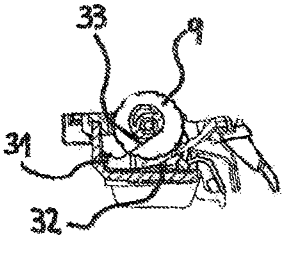
FIG. 32 is an illustration corresponding to FIG. 31 of the setting wheel region.

Accordingly, after disengaging the engagement between the setting wheels 9 on the one hand and the coupling hubs 11 on the other hand, the setting wheels 9, against the outer surface of which the latching arms 32 of the latch spring or leaf spring 31 do not rest, as is best shown in FIG. 32, are likewise brought from the position corresponding to the currently set key secret of the combination lock 7 to their original or zero position by the resilient adjusting arms 33 of the latch spring or leaf spring 31 that rest against the outer surface of the heart-shaped setting cams 12 on the setting wheel side.

Since the key secret of the combination lock is moved to its original or zero position by actuating the locking cylinder 8, the lock unit 2 can now be rotated relative to stator 3 and thus the lock 1 can be opened.

The combination lock 7 is reset again to the specified factory code. A user of the lock 1 will notice this and thus is informed that the lock 1 has been opened by someone else in the meantime.

Figure 9:
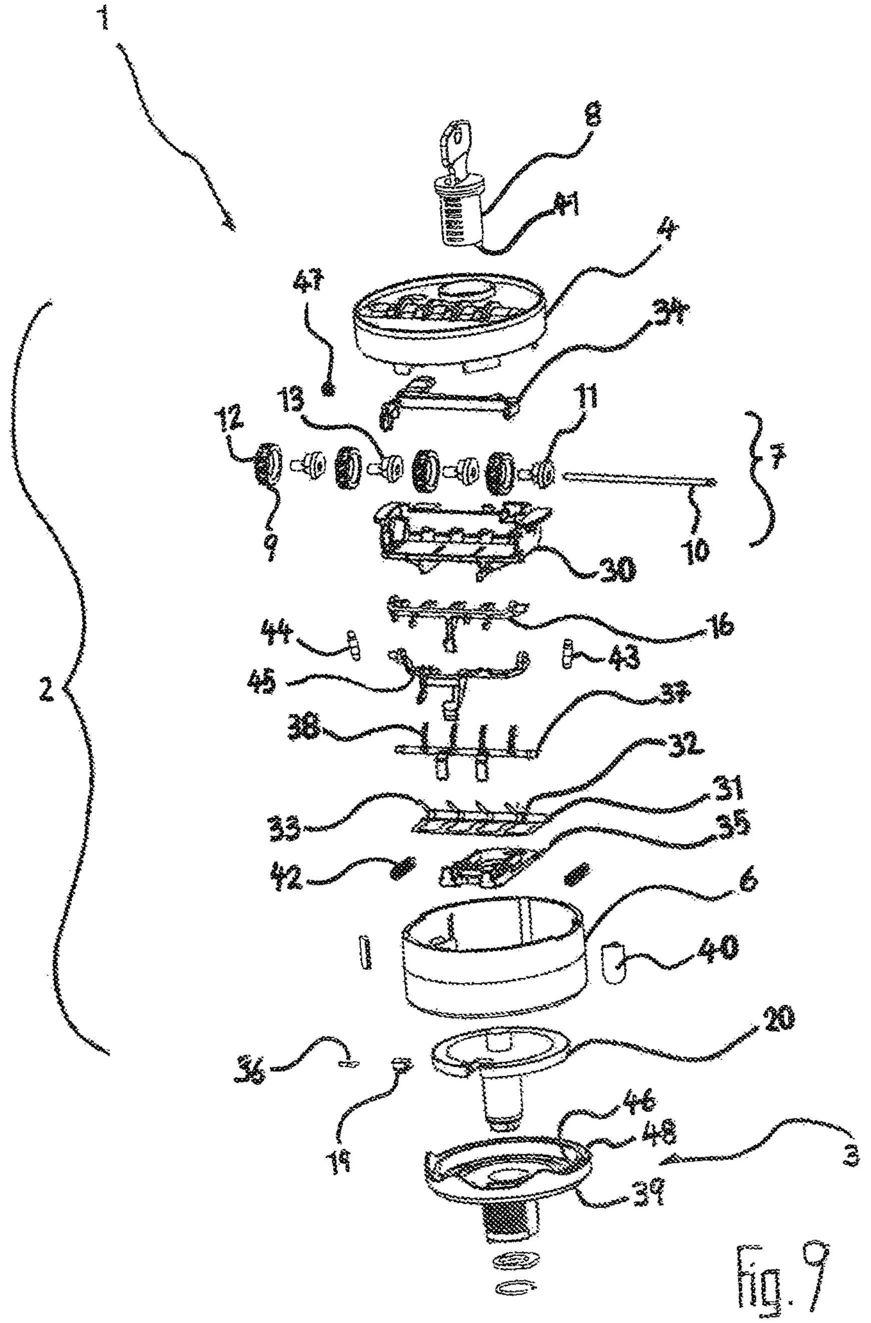
FIG. 9 is an exploded view of another embodiment of the lock according to the invention.
Figure 15:
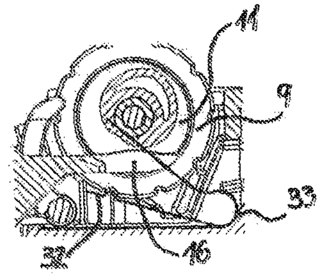
FIG. 15 is an enlarged detail view of a setting wheel region shown in FIG. 14.
Figure 16:
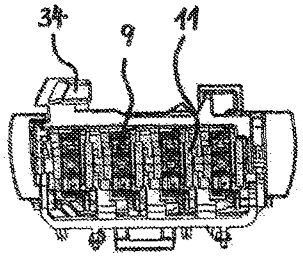
FIG. 16 is a top view of essential parts of a combination lock of the lock according to the invention shown in FIG. 9 during engagement between setting wheels and coupling hubs of the combination lock.

In the closed or freely rotatable position of the lock 1 shown in FIGS. 10 to 12, the probe 16 that also performs a locking function, is pulled by a tension spring 43, shown in FIG. 9, to the locking mechanism carrier 30 and thus in the direction of the coupling hubs 11 of the combination lock 7. Another tension spring 44, shown in FIG. 9 pulls a driver 45 that is mounted coaxially with the probe 16 against the probe 16.

The probe 16 rests against the outer surface of the coupling hubs 11. The latching arms 32 of the latch spring or leaf spring 31 rest against the outer surface of the setting wheels 9 of the combination lock 7.

The adjusting lugs 38 of the shifting lever 37 are at a spacing from the coupling hubs 11 and are exposed. The driver 45 is pulled by the tension spring 44 toward the probe 16 and thus into its freely rotatable position; the pressure latch 19 that can be moved by the driver 45 from its locking position shown in FIG. 11 into its engagement position, in which it provides the positive fit between the lock unit 2 and the locking latch 20, is in its locking position.

If the currently correct key secret or the currently correct opening code is entered on the combination lock 7, as shown in FIGS. 13 and 14, the probe 16 extends into the recesses of the coupling hubs 11; in doing so, the driver 45 is displaced to its open position due to the tension spring 44 connecting it to the probe 16. By displacing the driver 45, the pressure latch 19 is displaced in order to bring about a positive fit between the pressure latch 19 and the locking latch 20. As soon as the positive fit is established between the pressure latch 19 and the locking latch 20, the lock 1 can be opened. By rotating the lock unit 2 relative to the stator 3, the pressure latch 19 is guided in a circumferential track 46 formed in the lower plate 39 of the stator 3.

Figure 20:
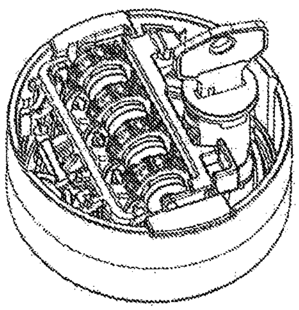
FIG. 20 is a perspective illustration to illustrate a shifting function in a normal operation of the embodiment of the lock according to the invention shown in FIG. 9.
Figure 21:
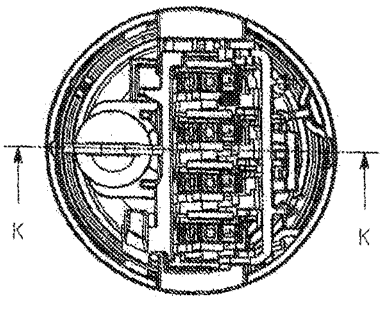
FIG. 21 is a top view of the embodiment of the lock according to the invention shown in FIG. 20.
Figure 22:
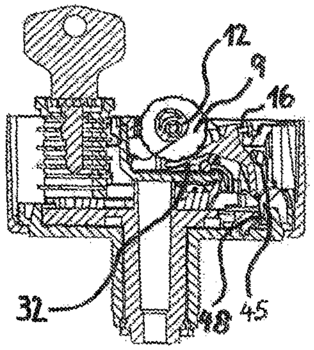
FIG. 22 is the section K-K in FIG. 21.
Figure 23:
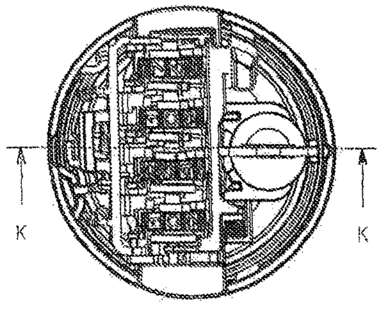
FIG. 23 is a top view of the embodiment of the lock according to the invention shown in FIG. 9 in closed or freely rotatable position.

The opening code set on the combination lock 7, as can be seen best from FIGS. 20 to 22, is displaced by the action of the resilient adjusting arms 33 of the latch spring or leaf spring 31 to the heart-shaped cams 12 of the setting wheels 9 during the opening process of the lock 1; e.g. each of the setting wheels 9 is set to "zero". For this purpose, the shifting cams 40 gauge the stator-side slide guide. By this slide guide, the shifting cams 40 are moved linearly upward and downward, whereby the latching arms 32 of the latching leaf or leaf spring 31 are separated from the setting wheels 9 by the probe 16. The shifting of the opening code or the key secret can be completed. The driver 45 is locked in another stator-side circumferential track 48 and cannot follow the movement of the probe 16.

This shifting function ensures that unauthorized third parties cannot access the respective current key secret or the respective current opening code of the combination lock 7, or only with great difficulty.

A recoding of the key secret of combination lock 7 is now described with reference to FIGS. 15 to 18.

Figure 19:
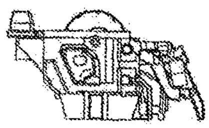
FIG. 19 is, for comparison, a side view of the combination lock with the coding slide blocked by the probe in the freely rotatable position of the embodiment of the lock according to the invention shown in FIG. 9.

With the key secret set on combination lock 7, the probe 16 rests against the recesses of the coupling hubs 11. The latching arms 32 of the latch spring or leaf spring 31 rest against the outer surface of the setting wheels 9. As is apparent from FIG. 16, the setting wheels 9 and the coupling hubs 11 of the combination lock 7 are still engaged. As can best be seen from FIG. 18, the probe 16 is in its release position, which allows the coding slide 34 to be actuated. For clarification, a blocking position of the probe 16 that blocks actuation of the coding slide 34 is shown in FIG. 19.

Figure 17:
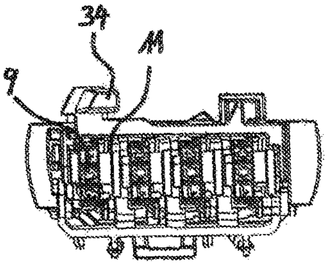
FIG. 17 is a top view of the combination lock corresponding to FIG. 16 with the engagement between the setting wheels and the coupling hubs disengaged.
Figure 18:
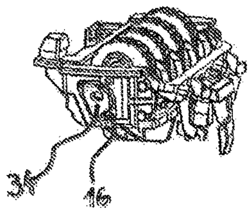
FIG. 18 is a perspective side view of the combination lock with a coding slide released for actuation by a probe of the combination lock in the coding position of the lock according to the invention.

The displacement that is now possible of the coding slide 34 into the position shown in FIG. 17 decouples the setting wheels 9 and the coupling hubs 11 of the combination lock 7. A new key secret can be set. A compression spring 47 shown in FIG. 9 can restore engagement between the setting wheels 9 and the coupling hubs 11 when the coding slide 34 is released.

The invention claimed is:

1. A lock comprising:

a lock plate;

a combination lock carried on the plate and having setting wheels with respective coupling hubs;

a secondary lock also carried on the plate;

a stator on the lock plate on which the combination lock and the secondary lock are rotatable, the lock plate carrying the combination lock and the secondary lock being able to freely rotate 360° relative to the stator in a locked state of the lock; and, means for, when the lock is opened by the secondary lock, uncoupling the setting wheels from the respective coupling hubs of the combination lock associated with the setting wheels and axially movable relative to the setting wheels and thereby resetting the setting wheels to an opening code of the combination lock from an opening code set by the secondary lock at the time of the opening of the lock to a specified factory code.

2. The lock according to claim 1, wherein the secondary lock is a key-operable locking cylinder whose actuation displaces a control lever of the lock to disengage the setting wheels from the respective coupling hubs of the combination lock.

3. The lock according to claim 1, further comprising:

respective heart-shaped setting cams on the setting wheels of the combination lock; and respective heart-shaped setting cams on the coupling hubs of the combination lock, each setting cam having on a respective setting wheel side and each setting cam on a respective coupling hub side having a respective adjusting lug of a shifting lever.

4. A lock comprising:

a lock plate;

a combination lock carried on the plate and having setting wheels with respective coupling hubs;

a secondary lock also carried on the plate;

a stator on the lock plate on which the combination lock and the secondary lock are rotatable, the lock plate carrying the combination lock and the secondary lock being able to freely rotate 360° relative to the stator in a locked state of the lock; and, means for, when the lock is opened by the secondary lock, uncoupling the setting wheels from the respective coupling hubs of the combination lock associated with the setting wheels and axially movable relative to the setting wheels and thereby resetting the setting wheels to an opening code of the combination lock from an opening code set by the secondary lock at the time of the opening of the lock to a specified factory code;

respective heart-shaped setting cams on the setting wheels of the combination lock;

respective heart-shaped setting cams on the coupling hubs of the combination lock, each setting cam having on a respective setting wheel side and each setting cam on a respective coupling hub side having a respective adjusting lug of a shifting lever, the lock plate formed by a housing and a lower end plate; and a spring biasing the lock plate from a position at a spacing from the stator toward the stator when recesses formed on the housing are aligned with lugs formed on the stator.

5. The lock according to claim 4, wherein, when the lock plate is pressed against the stator against the force of the spring, the shifting levers with their adjusting lugs can be brought to bear against the setting cams on the setting wheel side and the setting cams on the coupling hub side and displace the setting wheels and the coupling hubs of the combination lock in such a manner that the opening code of the combination lock is reset to the factory code.

6. The lock according to claim 1, wherein due to displacement of a slide plate of the lock by a key-operated locking cylinder, a probe of the lock can be displaced to a position in which a coding slide can be moved axially in order to disengage the setting wheels from the coupling hubs of the combination lock.

7. The lock according to claim 1, A lock comprising:

a lock plate;

a combination lock carried on the plate and having setting wheels with respective coupling hubs;

a secondary lock also carried on the plate;

a stator on the lock plate on which the combination lock and the secondary lock are rotatable, the lock plate carrying the combination lock and the secondary lock being able to freely rotate 360° relative to the stator in a locked state of the lock;

means for, when the lock is opened by the secondary lock, uncoupling the setting wheels from the respective coupling hubs of the combination lock associated with the setting wheels and axially movable relative to the setting wheels and thereby resetting the setting wheels to an opening code of the combination lock from an opening code set by the secondary lock at the time of the opening of the lock to a specified factory code;

respective heart-shaped setting cams on the setting wheels of the combination lock; and respective heart-shaped setting cams on the coupling hubs of the combination lock, each setting cam on the respective setting wheel side having a resilient adjusting arm of a latch spring or leaf spring and each setting cam on the respective coupling hub side having an adjusting lug of a shifting lever.

8. The lock according to claim 7, wherein the probe and a driver are mounted coaxially and are connected to one another so that during opening of the lock the driver is held and guided on a circumferential track of the stator and latching arms of the latch spring or leaf spring can be moved away from the setting wheels by the probe so that the setting wheels can rotate freely and can be reset by the resilient adjusting arms of the latch spring or leaf spring and the setting cams on the setting wheel side to a fixed predetermined number combination.

* * * * *